(12) United States Patent
Carlini

(10) Patent No.: US 10,061,873 B2
(45) Date of Patent: Aug. 28, 2018

(54) SYSTEM FOR INTEGRATED DESIGN OF ELECTRIC PLANT OF AN INDUSTRIAL SITE

(71) Applicant: ANSALDO ENERGIA S.p.A., Genoa (IT)

(72) Inventor: Giampietro Carlini, Arenzano (IT)

(73) Assignee: ANSALDO ENERGIA S.P.A., Genoa (IT)

(*) Notice: Subject to any disclaimer, the term of this patent is extended or adjusted under 35 U.S.C. 154(b) by 498 days.

(21) Appl. No.: 14/433,091

(22) PCT Filed: Oct. 7, 2013

(86) PCT No.: PCT/IB2013/059180
§ 371 (c)(1),
(2) Date: Apr. 2, 2015

(87) PCT Pub. No.: WO2014/054037
PCT Pub. Date: Apr. 10, 2014

(65) Prior Publication Data
US 2015/0261891 A1    Sep. 17, 2015

(30) Foreign Application Priority Data
Oct. 5, 2012    (IT) .............................. MI2012A1669

(51) Int. Cl.
G06G 7/48      (2006.01)
G06F 17/50     (2006.01)
G06F 17/30     (2006.01)

(52) U.S. Cl.
CPC .... G06F 17/5004 (2013.01); G06F 17/30312 (2013.01); G06F 2217/36 (2013.01)

(58) Field of Classification Search
CPC .................................................. G06F 17/5004
(Continued)

(56) References Cited

U.S. PATENT DOCUMENTS 6,559,844 B1     5/2003 Alamparambil
2007/0234241 A1  10/2007 Ting et al.

FOREIGN PATENT DOCUMENTS

CN    102289535 A    12/2011
IT    TO20111146     3/2012

OTHER PUBLICATIONS

Minutoli et al., "Ultra Modern Telecommunications & Workshops, 2009", Virtual Business Networks with Cloud Computing and virtual machines, Oct. 12, 2009, pp. 1-6.
(Continued)

Primary Examiner — Hugh Jones
(74) Attorney, Agent, or Firm — Greenblum & Bernstein, P.L.C.

(57) ABSTRACT

An integrated design system for an electric plant of an industrial site includes: a central processing unit; terminal stations connected to the central processing unit; and a storage unit. The central processing unit includes: a database management module to receive data from the terminals and organize the incoming data in databases; a first computing module, to determine specifications of lighting bodies to be installed according to the content of the databases; and a second computing module, cooperating with the first computing module to determine the sizing and routing of electric cables at least for the lighting bodies, according to the content of the databases. The databases include a lighting database containing values of a first set of parameters relating to environments of the industrial site.

12 Claims, 5 Drawing Sheets

(58) Field of Classification Search
USPC .............................................................. 703/6
See application file for complete search history.

(56) References Cited

OTHER PUBLICATIONS

Prudenzi et al., "A Software tool for Energy Audit Activities in Buildings", Jun. 11, 2008, pp. 452-456; XP031293401.
Anonymous, "Electrical Energy Equiment", , Jan. 1, 2006, pp. 1-40; XP055091827.
Anonymous, "SmartPlant Electrical 3.5", SmartPlante Electrical Basic. User's Training Guide, Sep. 30, 2005, pp. 152-160, 110-123, 207-227, 62-65.
Chadderton, "Building Services Engineering", Building Services Engineering, Jan. 1, 2000, pp. 261-279, 266-273.
Search report from Europe, dated Dec. 13, 2013, 3 pp.
Yang Zhanguang, "Discussion and Study on Three-Dimensional Design for Illumination of Centralized Control Buildings", Computer Engineering Application, dated Oct. 31, 2010, 3 pp.
Office Action issued in Chinese family member Patent Appl. No. 201380052256.0, dated Jun. 23, 2017 , along with an English translation thereof, 19 pp.

SYSTEM FOR INTEGRATED DESIGN OF ELECTRIC PLANT OF AN INDUSTRIAL SITE

TECHNICAL FIELD

The present invention relates to a system for integrated design of electric plant of an industrial site, in particular a power plant.

BACKGROUND ART

As known, designing electrical systems for an industrial site is complex and expensive in terms of economic and human resources.

In fact, there are many operations that need to be performed, among which we may list, by way of example, the sizing of the electric cables according to loads, utilities and characteristics of the system, the grouping of the electric signals within the various cables, the search of the shortest paths for routing the wirings, the management of the connections between the apparatuses to be powered and the switchboards or between the on-site instruments and the control panels.

In particular, in connection with the design part related to lighting, the selection of the number and type of lighting sources is also determined by parameters that affect the visual perception, such as for example the color of the predominant surfaces in an environment.

Downstream of the design activity, there is the need to draw up a detailed list of materials needed for the project implementation and then proceed with the procurement of the materials themselves. In addition, the site activities and the operations of installation and connection of the electric cables must be properly planned, while monitoring the work progress, so that the industrial site can be gradually put into operation as its portions are completed.

The currently available tools aiding in the stage of designing do not allow the entire procedure to be coped with as a whole and the designer must necessarily aggregate results of many processes to get an overview not only of the project, but also of the status of the work and operations related to the construction.

This problem can give rise to duplication of information, inconsistencies and errors in the processing and use of data, as well as deficiencies in the organization and execution of the work, and therefore this not infrequently causes waste of time and economic resources.

DISCLOSURE OF INVENTION

Therefore, it is a feature of the present disclosure to provide a system for integrated design of electric plant of an industrial site which allows the above limitations to be overcome.

BRIEF DESCRIPTION OF THE DRAWINGS

The present invention will now be described with reference to the accompanying drawings, which show a non-limiting example thereof, in which.

BEST MODE FOR CARRYING OUT THE INVENTION

Figure 1:
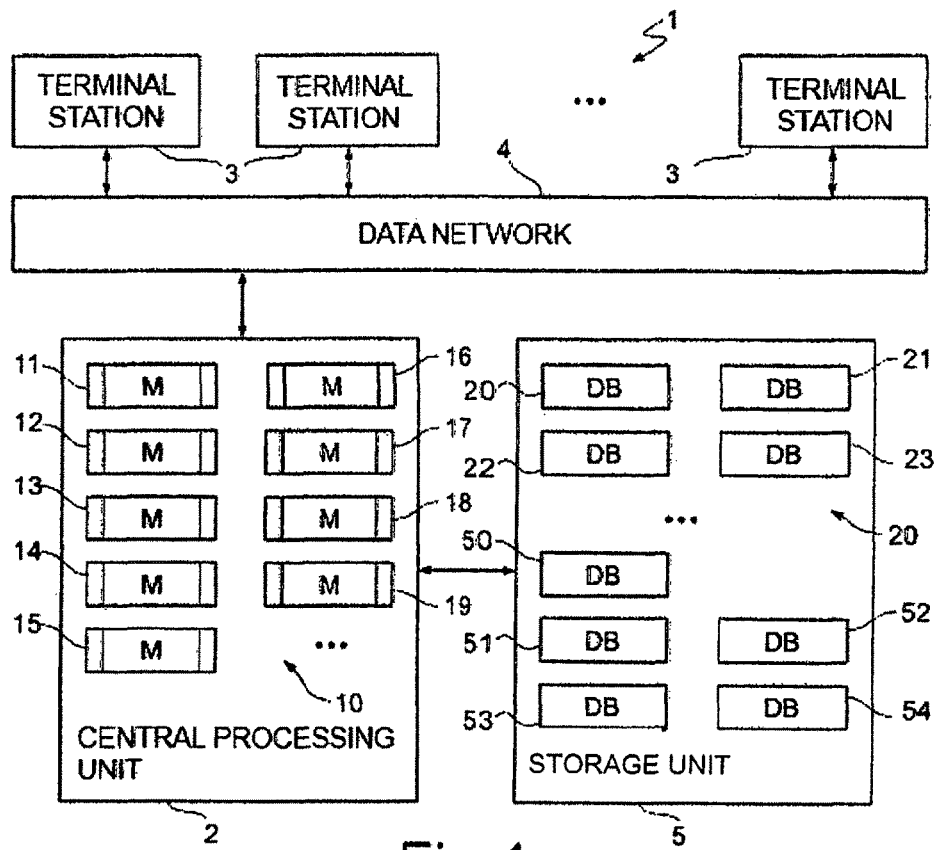
FIG. 1 shows a simplified block diagram of an integrated design system for an electric plant of an industrial site according to a preferred embodiment of the present invention.

With reference to FIG. 1, an electric plant design system 1 may conveniently comprise a central processing unit 2, of known type, connected to a plurality of terminal stations 3 over a data network 4 (for example a local network) and provided with a storage unit 5 for storing and archiving databases, as will be described in detail below.

Each terminal station 3 (not shown in detail) is managed by at least one operator and may include a processing unit for the local processing of data, a video terminal and a keyboard for displaying and inputting data, respectively, and a pointing device (typically a mouse).

Figure 2:
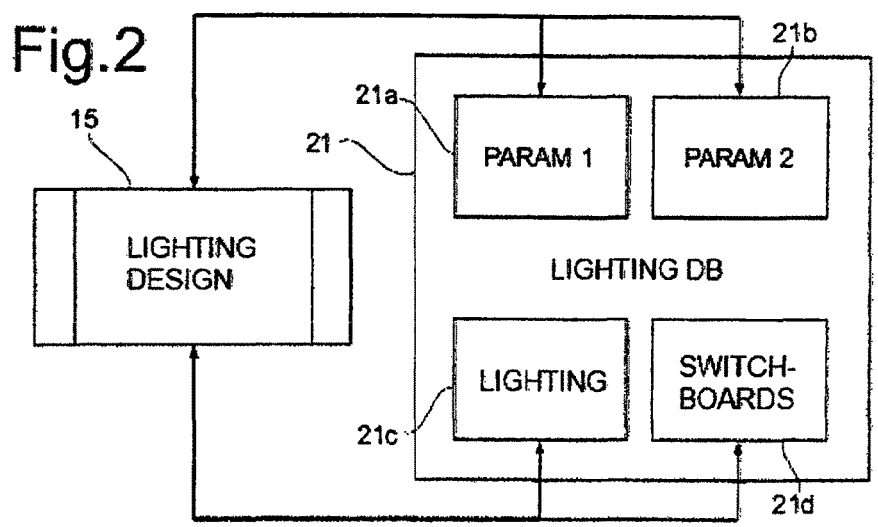
FIG. 2 shows a more detailed block diagram of a first portion of the system in FIG. 1.

As shown in FIG. 2, the central processing unit 2 and the storage unit 5 comprise a plurality of operating modules, globally indicated by reference numeral 10, and a plurality of databases, globally indicated by reference numeral 20, respectively. The operating modules 10 are intended to execute respective functions, as described below, using and/or modifying the data in databases 20.

In one embodiment, the processing unit 2 comprises:
a database management module 11;
an electric cable design module 12;
a material and component management module 13;
an activity management module 14;
a lighting design module 15;
an accounting management interface module 16;
a 3D model interface module 17;
a functional group management module 18;
a Profibus automatic generation module 19; and
an engineering database module 40.

In particular, the electric cable design module 12 automatically defines the size and routing of the electric cables of the industrial site, using the information contained in databases 20 and route optimization procedures.

The material and component management module 13 tracks the use of materials and components used in the industrial site and automatically procures materials and components according to the content of databases 20.

The database management module 11, the electric cable design module 12, the material and component management module 13 and the activity management module 14 may conveniently be made substantially as described in Italian patent no. 1351932, filed on 22 Apr. 2004 to the Applicant.

In particular, the database management module 11 is configured so as to allow the definition of database structures and data input through the terminal stations 3.

With reference to FIG. 2, the lighting design module 15 is a computing module that cooperates with a lighting database 21 in the storage unit 5 for automatically determining the features of the lighting system in different environments of the industrial site. The lighting database 21 contains values of a first set of parameters, relating to environments of the industrial site, and a second set of parameters, relating to different types of usable lighting bodies and accessory components (e.g. control devices, sockets, connector blocks, poles).

The first set of parameters, the values of which are collected in a table 21*a* in one embodiment, may include, inter alia:
- size of the environments;
- maximum light intensity required for every environment (e.g. expressed in lumens);
- color temperature required;
- wall reflectivity coefficients;
- location of the environments (building and floor).

The second set of parameters, the values of which are collected in a table 21*b* in one embodiment, may include, inter alia:
- lighting body type identifiers;
- power;
- light flow distribution;
- color temperature;
- accessory component identifiers.

Figure 3:
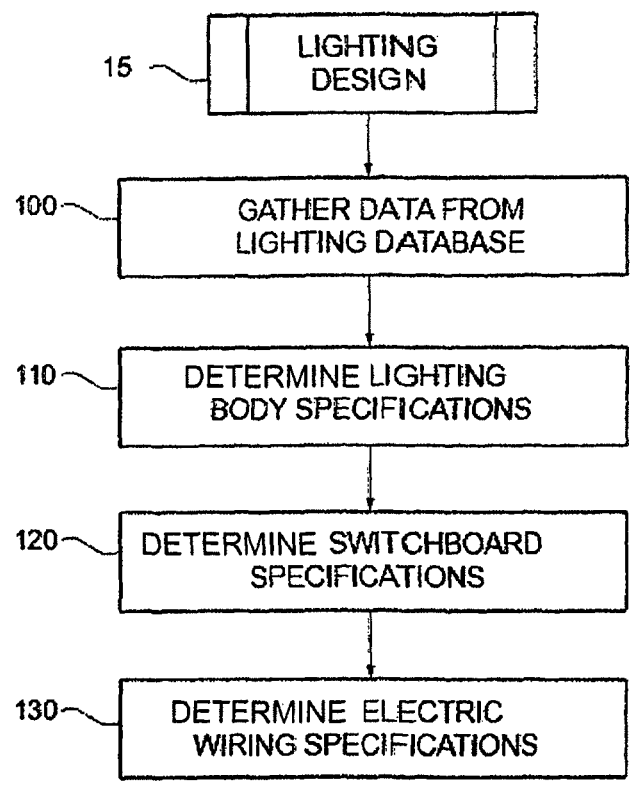
FIG. 3 shows a flow chart relating to operations performed by the first portion of the system in FIG. 1.

Once the lighting database 21 has been constructed using the database management module 11, the lighting design module 15 retrieves the data stored therein (FIG. 3, block 100) and uses them (block 110) to determine, for each environment defined in the industrial site, lighting body specifications. In particular, the lighting design module 15 automatically determines the number, type and power of the lighting bodies required to meet the lighting requirements defined in table 21*a* of the lighting database 21 (in particular, maximum light intensity and color temperature required).

In order to determine the indicated features of the lighting bodies, the lighting design module 15 uses the total flow or usage factor method, according to which the useful light flow to obtain a given average lighting level is related to the total light flow provided by the lighting bodies through a usage factor depending on the configuration of the environments (size, arrangement of work surfaces), on the reflectivity of the surfaces and on the features of the lighting bodies. In one embodiment, the lighting design module 15 is configured to calculate the usage factor on the basis of the parameters relating to the features of the environments stored in table 21*a*.

The results may be organized in lighting tables 21*c* and stored in the lighting database 21 (FIG. 2).

Moreover, the lighting design module 15 (FIG. 3, block 120) uses data of the lighting tables 21*c* to determine the number and specifications of primary and auxiliary switchboards required. Also in this case, the results may be organized in switchboard tables 21*d* and stored in the lighting database 21 (FIG. 2). In particular, the lighting design module 15 calculates the electric load of each floor of each building in the plant and accordingly automatically determines the number and size of switchboards required using the features stored in the switchboard tables 21*d*.

Finally (FIG. 3, block 130), the lighting design module 15 activates the electric cable design module 12 to automatically determine, based on the data contained in the lighting tables 21*c* and in the switchboard tables 21*d*, the types and number of electric cables and accessories required for the connection of lighting bodies, control devices and corresponding primary and auxiliary switchboards.

Figure 4:
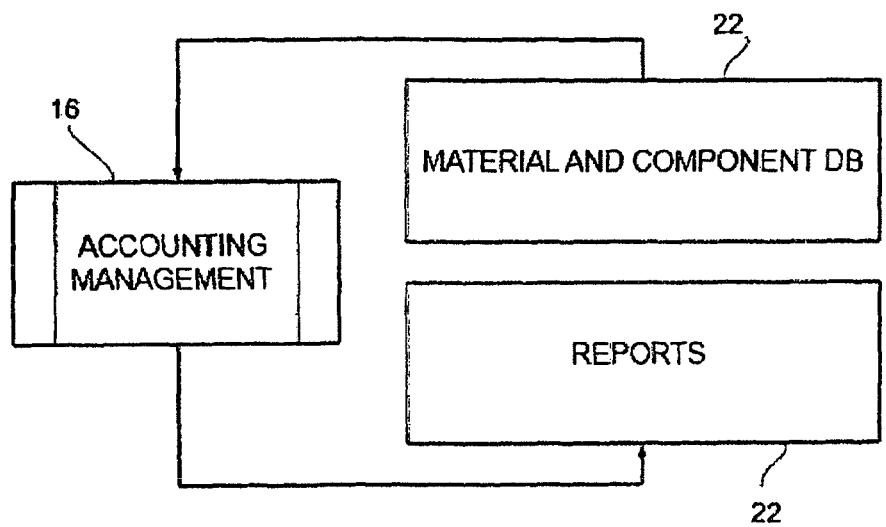
FIG. 4 shows a more detailed block diagram of a second portion of the system in FIG. 1.

With reference to FIG. 4, the accounting management interface module 16 uses a material and component database 22 to associate site activities and use of materials and to authorize payments in connection with the activities completed. The material and component database 22 contains, for each element (material or component), an identification code, a contract code which associates the element with an activity to be performed, in progress or completed, and a cost code.

The accounting management interface module 16 tracks the use of materials and components in connection with the activities, verifies the data relating to requests for payments according to the degree of completion of the activities, and prepares periodic reports 28 for the individual activities.

Figure 5:
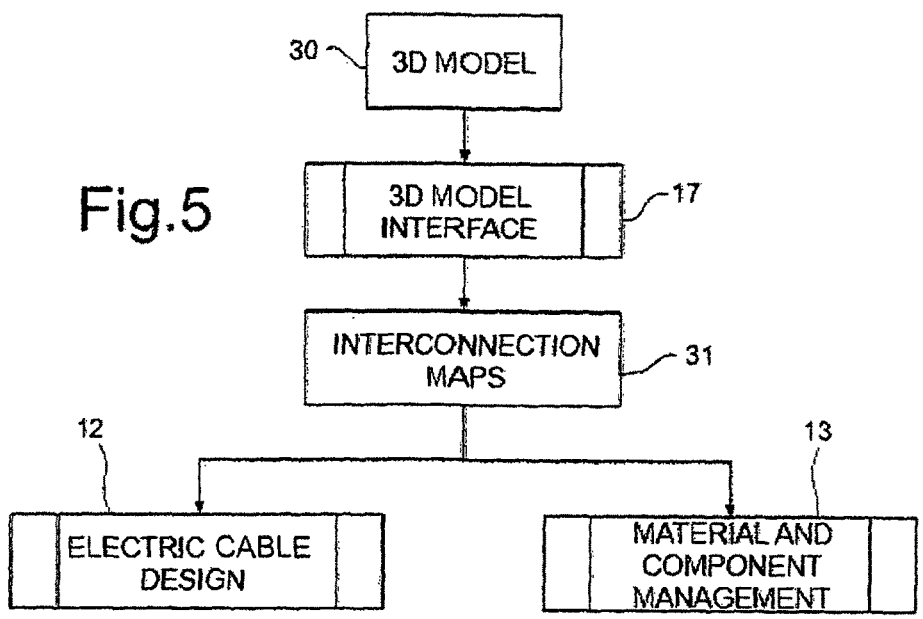
FIG. 5 shows a more detailed block diagram of a third portion of the system in FIG. 1.

With reference to FIG. 5, the 3D model interface module 17 is a computing module that uses a three-dimensional CAD model 30 of the industrial site, stored in the storage unit 5, to create interconnection maps 31 to be supplied to the electric cable design module 12 and to the material and component management module 13.

Figure 6:
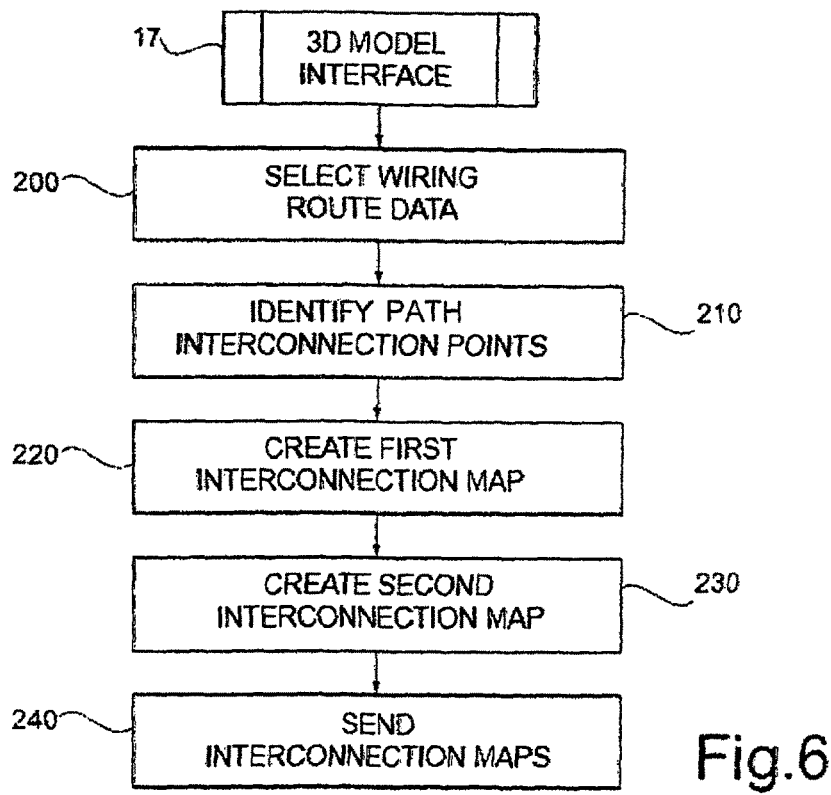
FIG. 6 shows a flow chart relating to operations performed by the third portion of the system in FIG. 1.

As shown in FIG. 6, the 3D model interface module 17 selects from the three-dimensional CAD model 30 the data (layers) relating to the paths reserved for wiring (block 200), identifies the intersection points between the paths and their coordinates (block 210), and builds a first interconnection map (block 220) and a second interconnection map (block 230).

The first interconnection map is in the form of a matrix with a general element Mij in position i (row), j (column) which is representative of the presence or absence of a direct connection through a path between the i-th and the j-th intersection points (identified by respective coordinates), without further intermediate intersection points (for example, element Mij has a non-zero value when a connection is present between the i-th and the j-th intersection points, and is zero when the connection is absent; in one embodiment, the value of the general element Mij, when other than zero, is a weight indicative of the distance between the i-th and the j-th intersection points).

The second interconnection map defines the types and specifications of the path sections between directly connected intersection points. The paths are defined by interconnected modular elements and may include, for example, walkways and raceways. For each path section, in addition to the type, the second interconnection map defines size, development of the path (straight sections, intersections) and accessory elements required (e.g. connection elements, supports).

The interconnection maps 31 are then provided to the electric cable design module 12 and to the material and component management module 13 (FIG. 5, FIG. 6, block 240). The electric cable design module 12 uses the interconnection maps 31 as a basis for computing the paths of electric cables. For example, the electric cable design module 12 determines the paths of electric cables through shortest path search, using the values stored in the interconnection maps 31, in particular in the first interconnection map, and a search algorithm, for example, Dijkstra's algorithm. In one embodiment, the electric cable design module 12 is configured to determine, for safety reasons, redundant paths alternative to the shortest paths.

The material and component management module 13 automatically generates procurement requests in connection with the materials and components required to implement the paths.

Figure 7:
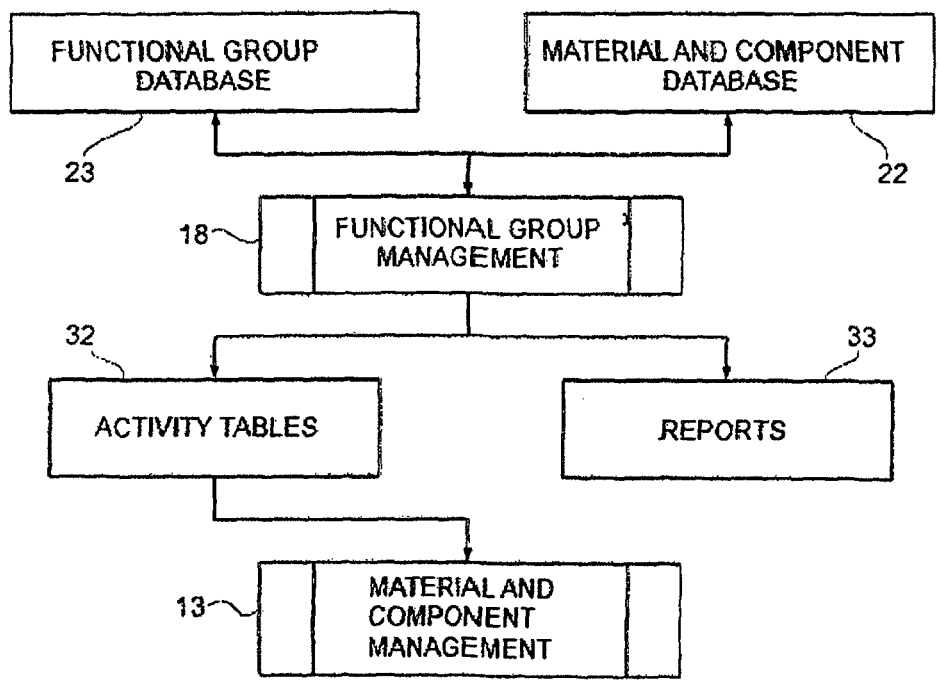
FIG. 7 shows a more detailed block diagram of a fourth portion of the system in FIG. 1.

With reference to FIG. 7, the functional group management module 18 uses a functional group database 23 and the material and component database 22 to determine work activity sequence tables 32 to implement the electric system and reports 33 on the work progress. Functional groups are subsystems of the industrial site intended to perform a certain specific function (e.g. supply water system or demineralized water system).

In particular, the functional group database 23 contains criteria that define a start-up sequence of the functional groups of the industrial site.

The tables 32 produced by the functional group management module 18 are organized so that the functional groups of the industrial site are in condition to be started according to a sequence defined by the criteria contained in the functional group database 23. In particular, tables 32 define sequences of installation and connection of cables and accessory components that allow the functional groups to be completed according to the criteria contained in the functional group database 23. Moreover, tables 32 contain activity sequences and corresponding lists of materials and components required.

The functional group management module 18 interacts with the material and component management module 13, which provides tables 32, to check the proper procurement of materials.

The functional group management module 18 also generates reports 33 on the progress of the work, specifically the installation of the electric system, with reference to the individual functional groups.

Figure 8:
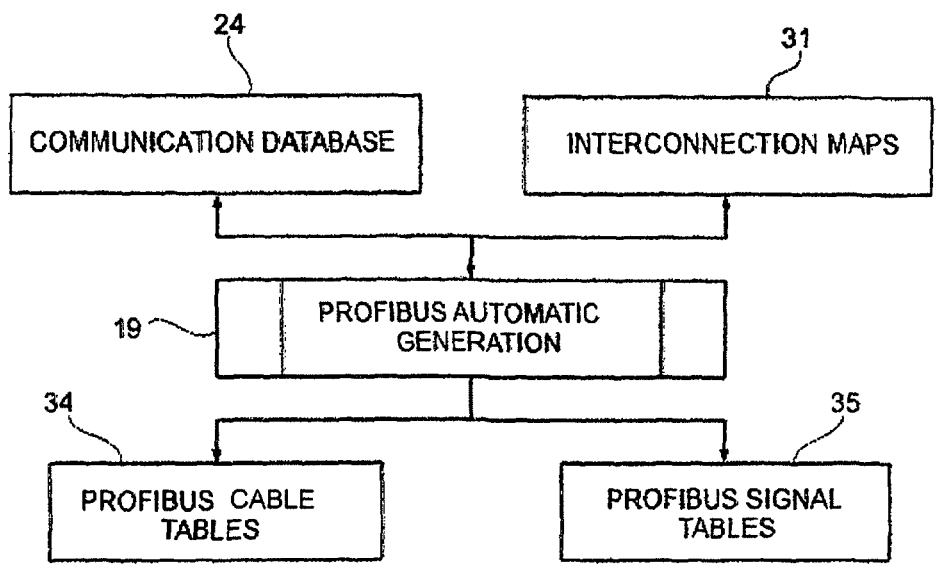
FIG. 8 shows a more detailed block diagram of a fifth portion of the system in FIG. 1.

With reference to FIG. 8, the Profibus automatic generation module 19 is a computing module that uses a communication database 24 and the interconnection maps provided by the 3D model interface module 17 to determine paths of Profibus-type cables. In particular, the communication database 24 contains a list of the devices of the industrial site that require a Profibus communication connection and, for each of them, a location in the industrial site and a list of signals to be exchanged over Profibus connection. Moreover, the communication database 24 may also contain a list of additional Profibus connection terminals originally not intended to be used.

The Profibus automatic generation module 19 uses the information contained in the communication database 24 and the interconnection maps 31 to determine Profibus cable tables 34 containing nodes and connections of a Profibus network, the extension and the physical path of the Profibus cables to be laid, and Profibus signal tables 35 indicating, for each signal defined in the communication database 24, a signal chain (sections of cables and nodes crossed). In particular, the generation of the Profibus cables is optimized by the Profibus automatic generation module 19, which groups the signals belonging to the same category and having common origin and destination (i.e. signals which have in common the location of the respective origin and destination devices). The Profibus automatic generation module 19 then selects one Profibus cable for each group of signals, so that all signals in the group can be routed along the same cable.

Figure 9:
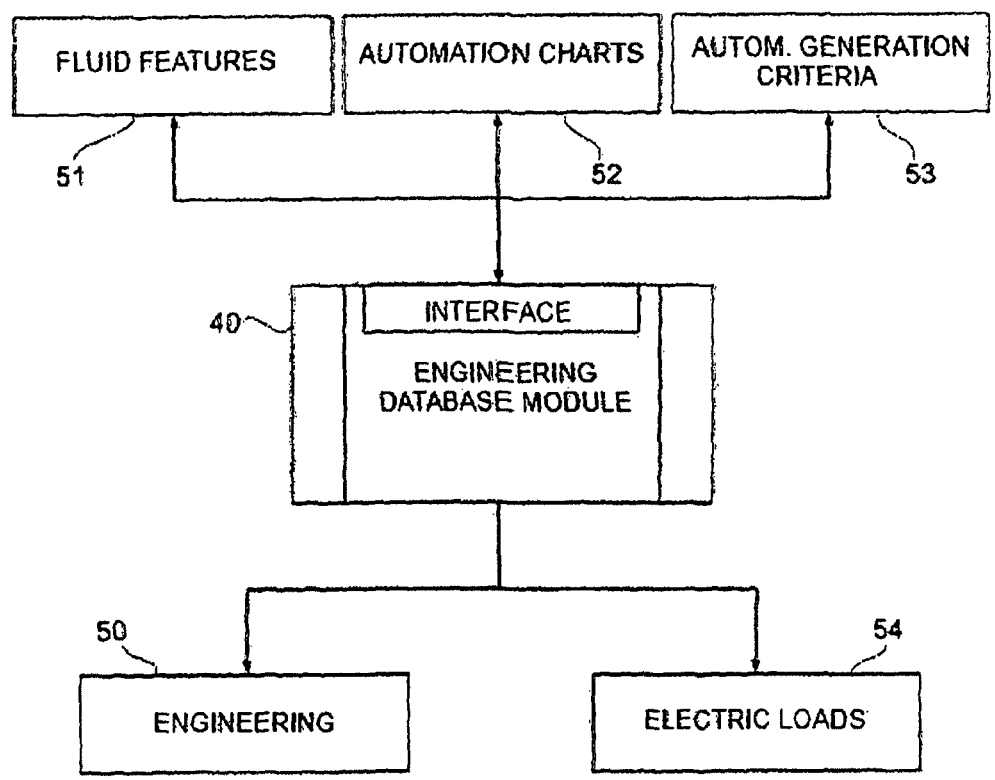
FIG. 9 shows a more detailed block diagram of a sixth portion of the system in FIG. 1.

With reference to FIG. 9, the engineering database module 40 is a computing module configured to extract and complete the data contained in process and automation schemes 41 generated by two-dimensional CAD systems, and to transfer the complete information to an engineering database 50. To this end, the engineering database module 40 includes an interface 42 for communication with two-dimensional CAD systems and uses additional databases, including:

a fluid characteristic database 51, which contains information relating to each fluid used in the system fluid lines and in which each fluid is identified by a respective code;

an automation chart database 52, which contains connection and communication charts of the components of the industrial site; and an automatic generation criteria database 53.

Through interface 42, the engineering database module 40 receives process and automation charts 41 from two-dimensional CAD systems and is configured to extract the synthetic information contained (represented by fluid or component codes). Moreover, the engineering database module 40 is configured to automatically perform the completion of the synthetic information taken from the process and automation charts 42. In particular, the engineering database module 40 retrieves completion information from the automation chart database 52, from the fluid characteristics database 51 and from the automatic generation criteria database 53, corresponding to the synthetic information extracted from the process and automation charts 41, and records the complete information, including synthetic data and the corresponding completion information, in the engineering database 50. In particular, the automatic generation criteria database 53 contains information relating to the implementation of measurement functions indicated in the automation chart database 52. More specifically, the automatic generation criteria database 53 contains information relating to the instruments to be used for the implementation of the measurement functions indicated in the automation chart database 52. The engineering database module 40 uses the automatic generation criteria database 53 for automatically determining the set and features of the instruments required.

On the basis of the measurement points defined in the process and automation charts 41, and through the instrument and signal generation criteria added to the library, the instruments and the digital, analog and Profibus signals required to manage the automation of the industrial site are automatically determined. Moreover, using the automation chart database 52, the signals relating to components to which a typical type of connection has been assigned, are automatically determined using the typical type library. The signals thus determined and then completed are made available for the automatic generation of control cables and instrumentation.

The engineering database module 40 is further configured to automatically identify all the components of the industrial site in need of power supply and to build an electric load database 54 with the specifications of the components identified. The electric load database 54 is made available to be used by the electric cable design module 12.

The system described advantageously allows the design of an industrial site, the procurement of materials and components, and the supervision of the work progress to be automatically performed, in particular as regards the implementation of the lighting system. In the practice, the system allows the design and execution costs to be reduced and also promotes access to the information by the operators involved in the process of implementation of the industrial site.

The identification of the lighting system specifications starting from the information in the databases allows compliance with the regulatory and functional restrictions, avoiding possible errors.

The 3D model interface module facilitates the preparation of the data required for the automatic design of the lighting system and of the Profibus connection network.

Finally, it is apparent that changes and variations may be made to the system described without departing from the scope of the present invention, as defined in the appended claims.

The invention claimed is:

1. A method for constructing an electric plant of an industrial site, the method comprising:
   providing a system for integrated design of the electric plant of the industrial site, the system having:
      a central processing unit;
      a plurality of terminal stations connected to the central processing unit over a data network; and
      a storage unit;
      wherein the central processing unit includes:
         a database management module configured to receive data from the terminal stations and to organize the incoming data into a plurality of databases;
         a first computing module, configured to automatically determine number, type and power of lighting bodies to be installed at the industrial site, according to the content of the databases; and
         a second computing module cooperating with the first computing module and configured to:
            determine the sizing and routing of electric cables, at least for the lighting bodies, according to the content of the databases;
            determine the sizing and routing of electric cables on the basis of the connection maps;
            determine paths of electric cables by shortest path search, on the basis of the connection maps;
         a third computing module configured to:
            receive a three-dimensional model of the industrial site from the storage unit,
            select data relating to wiring-dedicated paths from the three-dimensional model;
            identify intersection points of wiring-dedicated paths;
            determine the coordinates of the intersection points from the three-dimensional model; and
            construct connection maps on the basis of the intersection points; and
      wherein the databases include a lighting database containing values of a first set of parameters relating to environments of the industrial site and including: size of environments, maximum light intensity required, wall reflectivity coefficients in the environments; and
   constructing the electric plant based on the integrated design provided by the system.

2. The method according to claim 1, wherein the lighting database contains values of a second set of parameters, relating to usable lighting bodies and accessory components.

3. The method according to claim 2, wherein the second set of parameters includes: lighting body type identifiers, lighting body power, accessory component identifiers.

4. The method according to claim 1, wherein:
   the first set of parameters stored to the lighting database includes a position of the environments in respective buildings and floors; and
   the first computing module is further configured to automatically determine electric loads relating to each floor of each building present in the plant and to determine number and specifications of primary and auxiliary switchboards according to the electric loads identified.

5. The method according to claim 1, wherein the connection maps include a first connection map in the form of a matrix, with the general element in position i, j is representative of the presence or absence of a direct connection through a path between an i-th intersection point and a j-th intersection point having respective coordinates.

6. The method according to claim 1, wherein the connection maps include a second connection map defining path section specifications between directly connected intersection points, the paths including connected modular elements.

7. The method according to claim 1, wherein the databases include a communication database containing a list of industrial site devices requiring a Profibus communication connection and, for each device requiring a Profibus communication connection, a location in the industrial site and a list of signals to be exchanged over the Profibus connection;
   and wherein the central processing unit includes a fourth computing module configured to receive the connection maps and to determine paths of Profibus cables according to the communications database.

8. The method according to claim 7, wherein the fourth computing module is further configured to collect the signals exchanged over the Profibus connection into groups of signals belonging to the same category and having common origin and destination, and to select one Profibus cable for each group of signals, so that all the signals of the group of signals can be routed along the same cable.

9. The method according to claim 1, wherein the databases include a functional unit database containing criteria defining a start-up sequence of functional units of the industrial site;
   and further including a first management module configured to determine tables defining work activity sequences of the electric system so that functional groups of the industrial site are completed in accordance with the start-up sequence contained in the databases.

10. The method according to claim 9, further including a second management module configured to automatically procure material and components according to the content of the databases; and wherein the first management module is further configured to supply the tables to the second management module.

11. A method for constructing an electric plant of an industrial site, the method comprising:
   providing a system for integrated design of the electric plant of the industrial site, the system having:
      a central processing unit;
      a plurality of terminal stations connected to the central processing unit over a data network; and
      a storage unit;
      wherein the central processing unit includes:
         a database management module configured to receive data from the terminal stations and to organize the incoming data into a plurality of databases;
         a first computing module, configured to automatically determine number, type and power of lighting bodies to be installed at the industrial site, according to the content of the databases; and
         a second computing module cooperating with the first computing module and configured to determine the sizing and routing of electric cables, at least for the lighting bodies, according to the content of the databases;
         a third computing module configured to:
            receive a three-dimensional model of the industrial site from the storage unit, select data relating to wiring-dedicated paths from the three-dimensional model;

identify intersection points of wiring-dedicated paths;

determine the coordinates of the intersection points from the three-dimensional model; and construct connection maps on the basis of the intersection points a fourth computing module configured to:

receive process and automation charts from two-dimensional CAD systems to extract first data contained in the process and automation charts;

extract second data relating to completion information of the first data from additional databases using the first data extracted; and record complete information, including the synthetic data and the corresponding completion information, in an engineering database, and wherein the databases include a lighting database containing values of a first set of parameters relating to environments of the industrial site and including: size of environments, maximum light intensity required, wall reflectivity coefficients in the environments; and constructing the electric plant based on the integrated design provided by the system.

12. The method according to claim 11, wherein the additional databases include:

an automation chart database;

a fluid characteristic database; and a criteria database for the automatic generation of instruments for implementing measurement functions;

and wherein the fourth computing module is configured to determine a set of instruments according to the database content for the automatic generation of instruments for implementing measurement functions.

* * * * *